Aug. 12, 1958  H. J. HIBSHMAN  2,847,083
FRACTIONATOR DESIGN
Filed June 18, 1956

Henry J. Hibshman   Inventor

By Richard H. Nagel  Attorney

United States Patent Office 2,847,083
Patented Aug. 12, 1958

2,847,083

FRACTIONATOR DESIGN

Henry J. Hibshman, Plainfield, N. J., assignor to Esso Research and Engineering Company, a corporation of Delaware Application June 18, 1956, Serial No. 591,909

2 Claims. (Cl. 183—24)

The present invention relates to an improved apparatus for countercurrently contacting vapor and liquid in a confined vessel. More particularly, it relates to an improved means for contacting liquid with vapor or gas wherein the latter is introduced tangentially into a frusto-conical vessel at a high velocity, and the two phases are separated by means of the centrifugal force produced by the spiralling vapor or gas.

The invention may be used in the fractionation of condensable vaporous materials, as in the separation of petroleum products, the manufacture of alcohols, the debutanization of and stabilization of naphtha, or in any process in which vapor or gas is to be contacted with liquid to exchange heat or some component.

Conventional vapor-liquid contacting vessels involve considerable internal structure, for example, bubble plates, packing, piping, etc. It is an object of the present invention to disclose a multistage fractionation apparatus which has no downcomers, ducts, vanes, etc., thus greatly simplifying the fractionation method.

A further object of the present invention is to provide a form of vapor-liquid contacting apparatus that is capable of high capacity operation.

These objects are achieved by employing an inverted frusto-conical vessel into which the vapor or gas is introduced tangentially at the periphery of the vessel, passing inwardly toward the center of the vessel in a spiral path of successively decreasing radii and leaving through a port located in the center of the vessel's roof. The liquid is introduced near the center of the vessel by means of a common conduit which has several distribution pipes attached to it. The perforations in these pipes which run parallel to the central axis of the device are positioned so that they are somewhat removed from the vapor exit port in order to prevent entrainment with the vapor. The liquid is thrown to the outer wall by the centrifugal force imparted by the swirling vapors. As the liquid droplets pass through the successive spiral paths of vapor, effective countercurrent contacting is accomplished. The liquid collects on the inner wall of the vessel and is removed through an appropriate opening in the upper portion of the wall or roof of the vessel at its periphery.

The vapor port may consist of an opening near the center of the vessel's roof. However, better vapor distribution is obtained if a cylindrical member approximately the diameter of the port is placed in the center of the unit. This cylindrical member should have 1 or more openings therein so that vapors can pass freely from the contacting zone through the openings and out the central port. In order to assure minimum distortion of the vapor's spiral pattern, these openings are preferably rectangular and approximately the same size in total area as the vapor inlet.

The velocity of the gas or vapor will vary with such factors as the density, surface tension and other properties of the fluids contacted as well as the operating conditions employed. The velocity should be high enough to force the liquid up the conical wall to the liquid outlet. In general, it is considered that suitable superficial gas velocity at the discharge end of the tangential inlet may be as much as 300 feet per second, but it is preferred that the velocity be between about 60 to about 150 feet per second. The velocity values are expressed in terms of dry gas. Furthermore, the term gas as used herein embraces vapors as well as gases.

Although the liquid may be introduced under pressure, this is not necessary. It may be introduced at a very low pressure because the high velocity vapor will atomize the liquid on contact.

The liquid stream leaving the vessel may be withdrawn as product, or it may be entirely or partially returned to the vessel as liquid recycle.

Figure 1:
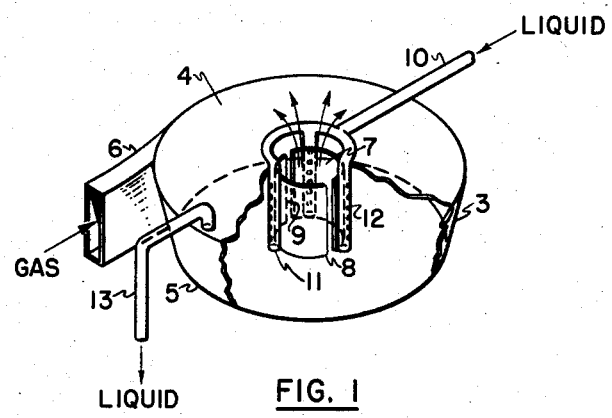
Figure 1 is a perspective view of the invention, partly in section.
Figure 2:
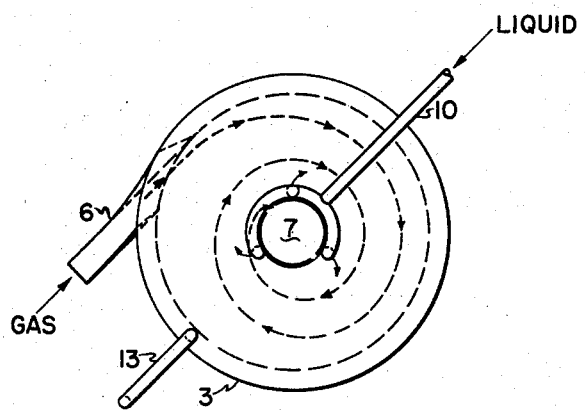
Figure 2 is a top view of the apparatus depicted in Figure 1.

Referring to the figures, there is illustrated in Figures 1 and 2 an inverted frusto-conical vessel having liquid and gas inlets and outlets and defined by wall 3, roof 4 and base 5. The vapor or gas inlet 6 is attached tangentially at the periphery of the vessel's wall 3. The gas outlet port 7 is located in the center of the roof 4. A cylindrical member 8, approximately the diameter of port 7, occupies the center of the unit and is sealed at the top to the roof 4 and at the bottom to base 5. This member has one or more rectangular perforations 9 therein which extend almost the entire distance between the vessel's roof and base. The liquid is introduced through a manifold conduit 10 which has several distribution pipes 11. These pipes enter the vessel in an area surrounding the vapor port 7 and run along the outer surface of the cylinder member 8, parallel to its axis, almost to the base 5 of the vessel. The pipes 11 are sealed at their lower end, but have perforations or slots 12 through which the liquid flows or sprays into the vessel. A liquid outlet conduit 13 is located in the roof 4 of the vessel at its periphery. The liquid outlet has a vapor seal, such as a liquid trap, to prevent vapor from accompanying the existing liquid.

The area of the port 7 and the total area of the openings 9 should be about equal to the area of the gas inlet in order to avoid excessive pressure drops.

Figure 3:
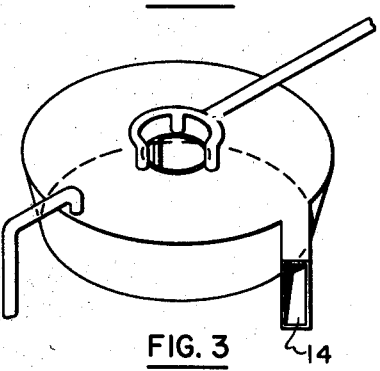
Figure 3 is a perspective view of another embodiment of the invention, partly in section.

To insure more uniform vapor flow, the rectangular vapor or gas inlet may be positioned so that its major axis is parallel to the axis of the vessel rather than parallel to the vessel wall as shown in Figures 1 and 2. Referring specifically to Figure 3, which shows this embodiment, the major axis of inlet 14 is parallel to the axis of the vessel so that the gas or vapor enters the vessel at a right angle to the base.

In order that the invention may be better understood, the following is a brief description of what occurs when the apparatus is operating.

Vapor having velocity of between 60 and 150 feet per second is introduced into the inverted frusto-conical vessel through conduit 6, which is tangent to the walls 3. The vapor passes inwardly toward the center in a spiral path of successively decreasing radii and leaves the vessel by means of a rectangular opening 9 in the cylindrical member 8 and vapor port 7. The liquid is introduced into the vessel at a rate such that about 0.1 to about 10 parts by weight of liquid enter the vessel per 1 part by weight of vapor or gas. The liquid enters through conduit 10, from which it flows into distribution pipes 11 and through the perforations 12 into the vapor stream.

The vapor atomizes the liquid on contact. Centrifugal force causes the liquid to pass through each of the several paths formed by the vapor. Thus, the effect of a multi-stage fractionation is obtained without the need of using superposed successive stages. The liquid is forced toward the wall 3 of the vessel by centrifugal force and collects on the wall. Because of the high velocity of the vapor, it collects along the upper portion of the wall 3 from which point it is withdrawn from the vessel by means of the liquid outlet 13.

The following example is given to illustrate the various aspects of the invention:

An apparatus of the type described having an overall diameter of 12 inches, a height of 3 inches, a tangential vapor inlet 1 inch wide and 3 inches high and a vapor port 2 inches in diameter was employed to absorb ammonia from air. The absorbent in this case was water. The air, which contained 0.5 weight percent ammonia, was fed into the vessel at the rate of 20,000 cu. ft./min. The water was introduced at the rate of about 500 gal./min. Essentially all of the ammonia was removed from the air which is what is found when three perfect countercurrent stages are employed.

It will be appreciated that many variations and modifications may be incorporated within this basic concept without departing from the scope and spirit of the present invention.

What is claimed is:

1. Apparatus for intimately contacting a liquid with a vapor comprising an inverted frusto-conical vessel; a tangential vapor inlet communicating with the interior of said vessel; a vapor outlet communicating with the interior of said vessel and defined by a perforated cylindrical member extending axially from the bottom of said vessel to a port in the top thereof, the area of the perforations in said cylindrical member and the area of said port being substantially equal to the cross-sectional area of said vapor inlet; liquid inlet conduits projecting through the top of said vessel and extending the length of said vessel in proximity to said cylindrical member, said conduits being perforated to direct liquid streams toward the periphery of said vessel; a liquid inlet manifold communicating with said inlet conduits; and a liquid outlet extending through the top of said vessel at the periphery thereof.

2. Apparatus as defined by claim 1 wherein said vapor inlet is of rectangular cross-section and the major axis thereof is parallel to the axis of said vessel.

References Cited in the file of this patent

UNITED STATES PATENTS

| | | |
|---|---|---|
| 1,895,652 | Fisher | Jan. 31, 1933 |
| 2,233,019 | Linderman | Feb. 25, 1941 |
| 2,235,998 | Kleinschmidt | Mar. 25, 1941 |
| 2,351,864 | Linderman | June 20, 1944 |
| 2,593,548 | Edwards | Apr. 22, 1952 |
| 2,653,801 | Fontein et al. | Sept. 29, 1953 |
| 2,808,897 | Reinsch et al. | Oct. 8, 1957 |

FOREIGN PATENTS

| | | |
|---|---|---|
| 731,230 | Great Britain | June 1, 1955 |